United States Patent [19]

Kremer et al.

[11] 3,925,519
[45] Dec. 9, 1975

[54] DEODORIZED MERCAPTAN-CONTAINING PHOSPHOROTRITHIOITES AND PROCESS OF PREPARATION

[75] Inventors: Ross A. Kremer, Belle Mead; Richard H. Leitman, Kendall Park, both of N.J.

[73] Assignee: Mobil Oil Corporation, New York, N.Y.

[22] Filed: May 6, 1974

[21] Appl. No.: 467,026

[52] U.S. Cl. ............... 260/967; 260/941; 260/944; 260/989
[51] Int. Cl.² ............................................ C07F 9/201
[58] Field of Search ............ 260/989, 941, 944, 967

[56] References Cited
UNITED STATES PATENTS 3,309,432   3/1967   English ................................ 260/989
3,439,071   4/1969   Marks et al ......................... 260/989

*Primary Examiner*—Richard L. Raymond
*Attorney, Agent, or Firm*—Charles A. Huggett; Howard M. Flournoy

[57] ABSTRACT

A method of stabilizing organothiophosphorus compounds against odor development which comprises mixing said organothiophosphorus compounds with appropriate amounts of a suitable anhydride. Mixtures thereof have an acceptable or pleasant odor and are suitable for use as pesticidal or plant growth regulant compositions.

10 Claims, No Drawings

DEODORIZED MERCAPTAN-CONTAINING PHOSPHOROTRITHIOITES AND PROCESS OF PREPARATION

BACKGROUND OF THE INVENTION

1. Field of the Invention

This invention is directed to a process or method of stabilizing at low odor levels organothiophosphorus compounds and to novel compositions comprising such compounds admixed with a suitable anhydride. Exemplary organothiophosphorus compounds are phosphorotrithioites such as S,S,S triethyl phosphorotrithioite and S,S,S tributyl phosphorotrithioite. A suitable anhydride is acetic anhydride. This invention is further directed to compositions comprising same and a carrier therefor, adapted for use as pesticides or plant growth regulants.

2. Description of the Prior Art

U.S. Pat. Nos. 3,112,244 and 3,268,393 respectively disclose a method for controlling nematodes and a method for killing insects with certain organothiophosphorus compounds such as phosphorothioites. Such compounds are also known to be plant growth regulants, i.e., cotton defoliants. It is also known in the art that certain aldehydes, (i.e., U.S. Pat. No. 3,309,434), peroxides, (i.e., U.S. Pat. No. 2,879,284), metallic salts or complexes (i.e., British Patent 960,013) and compounds containing unsaturated tertiary carbons (i.e., Netherlands Application No. 6,412,188) may be used for deodorization of certain organothiophosphorus compounds.

Vacuum stripping at relatively high vacuums has been tried as a means of removing sufficient residual mercaptan, which accumulates in phosphorotrithioite manufacture, to eliminate product stench. However, even if sufficient mercaptan is removed it will be reformed and odor recur on aging of the phosphorotrithioite compounds.

No reference is known to my knowledge showing the use of anhydrides as a means of stabilizing organothiophosphorus compounds at low odor levels, nor is any reference known to my knowledge which discloses a process embodying gas sparging a normally malodorous organothiophosphorus compound, e.g. a phosphorotrithioite, combined with the addition of appropriate amounts of an anhydride, e.g. acetic, stabilizer to prevent odor recurrence.

SUMMARY OF THE INVENTION

This invention provides for a method of stabilizing against malodor development an organothiophosphorus compound having the following general formula:

$$P(SR)_3$$

wherein R is a member of the group consisting of hydrogen, lower alkyl ($C_1$-$C_8$), substituted alkyl ($C_1$-$C_8$), phenyl, alkyl-substituted phenyl, halo-substituted phenyl, phenyl substituted phenyl and carbethoxy alkyl which comprises adding to said compound a sufficient amount to stabilize said compound against malodor development of a suitable aliphatic anhydride; substantially deodorized compositions comprising an organothiophosphorus compound as disclosed hereinabove and a sufficient amount, to stabilize said compositions against malodor development, of said anhydride; and compositions comprising the organothiophosphorus compound, said anhydride and a solid or liquid carrier therefor.

In more specific embodiments the present invention is directed to a method of stabilizing against malodor phosphorotrithioite compounds wherein (1) R is selected from the group consisting of alkyl of 1–8 carbon atoms and substituted alkyl of 1–8 carbon atoms and said anhydride is an alkyl anhydride of 1–20 carbon atoms and (2) R is alkyl of 1–8 carbon atoms and said anhydride is acetic anhydride. Representative compounds of such embodiments are S,S,S tributyl phosphorotrithioite and S,S,S, triethylamino phosphorotrithioite.

This invention also provides for a process of producing substantially deodorized phosphorotrithioite compositions (adaptable for use as pesticides or plant growth regulants) wherein said phosphorotrithioites have an offensive mercaptan odor due to the presence of residual mercaptan used in their manufacture and the formation of additional mercaptan on aging of said compounds. The objective of said process is to reduce residual mercaptan to low odor levels and to prevent odor recurrence. The instant process involves reducing or eliminating said mercaptan odor by gas sparging and then adding sufficient amounts of a suitable anhydride to the product to prevent odor recurrence. Furthermore, in compounds or compositions embodied by the invention having about 500 ppm of residual mercaptan, the mercaptan odor may be substantially eliminated and the compound stabilized against malodor recurrence by treating the phosphorodithioite with said anhydride without prior gas sparging. By these techniques the residual mercaptan odor in said phosphorotrithioites or compositions thereof is substantially eliminated or drastically reduced and prevented from recurring.

DESCRIPTION OF SPECIFIC EMBODIMENTS

As will be noted, the compounds for use in the present invention are (1) phosphorotrithioite compounds which normally have a characteristic objectionable odor and (2) an odor stabilizing compound. Non-limiting examples of organothiophosphorus compounds which may be used in the process and in compositions according to the invention as embodied herein include compounds having the following general formula:

$$P(SR)_3$$

Non-limiting examples of such compounds are:
S,S,S trimethyl phosphorotrithioite,
S,S,S triethyl phosphorotrithioite,
S,S,S tripropyl phosphorotrithioite,
S,S,S tributyl phosphorotrithioite,
S,S,S tripentyl phosphorotrithioite,
S,S,S, tri(chloromethyl)phosphorotrithioite,
S,S,S tri(iodobutyl)phosphorotrithioite,
S,S,S tri(aminopropyl)phosphorotrithioite,
S,S,S tri(aminopropyl)phosphorotrithioite,
S,S,S tri(ethylphenyl)phosphorotrithioite,
S,S,S tri(aminophenyl)phosphorotrithioite,
S,S,S tri(benzophenyl)phosphorotrithioite,
S,S,S tri(carbethoxypropyl)phosphorotrithioite, and
S,S,S tri(carbethoxybutyl)phosphorotrithioite, etc.

Non-limiting examples of stabilizers which are suitable for use in accordance with this invention are aliphatic anhydrides, preferably saturated and preferably alkyl, having from about 1–20 carbon atoms.

Non-limiting examples of such compounds are:
Acetic anhydride,
Propionic anhydride, Butyric anhydride,
Valeric anhydride,
Heptanoic anhydride,
Palmitic anhydride, and
Acrylic anhydride, etc.

In the formulation of the compositions of the present invention, it is preferred to mix the compounds in their liquid state, particularly when a composition is to be used as a pesticide. Therefore, the odor stabilizing compound and the organothiophosphorus compound are preferably mixed as liquids. The resulting liquid mixture may then be advantageously combined with, for example, solid carriers to provide a product in granular form.

The compositions of the present invention may be used in various ways to achieve the desired action according to the particular organothiophosphorus compound used. They can be applied as dusts, as liquid sprays, or as gas-propelled sprays and can contain, in addition to a carrier, additives such as emulsifying agents, gases compressed to the liquid state, other stabilizers and the like. A wide variety of liquid and solid carriers can be used in the compositions embodied in this invention. Non-limiting examples of the liquid carriers include water; organic solvents such as alcohols, ketones, amides, and esters; mineral oils, such as kerosene, light oils, and medium oils; and vegetable oils such as cottonseed oil. Non-limiting examples of solid carriers include talc, bentonite, diatomaceous earth, pyrophyllite, Fuller's earth, gypsum, flours derived from cottonseeds and nutshells, attaclay (attapulgite) and various natural and synthetic clays having a pH not exceeding about 9.5.

In practice, the compositions according to the invention may be prepared in the form of concentrates which are diluted in the field to the concentration desired for application as pesticides or as plant growth regulants. For example, the concentrate mixture can be a wettable powder containing large amounts of the desired organothiophosphorus compound, a carrier, e.g. attapulgite or other clay, and wetting and dispersing agents. Such powders can be diluted prior to application by dispersing them in water to obtain a sprayable suspension containing the concentration of phosphorotrithioite desired for application. Other concentrate mixtures can be solutions that can be later diluted, e.g. with kerosene. Thus, it is within the contemplation of this invention to provide such compositions containing from about 5-10% to about 85% by weight of the total composition, of for example a phosphorotrithioite compound. Accordingly, depending upon whether it is ready for application or it is in concentrated form said contemplated compositions preferably contain between about 65% and 80% by weight of the composition of at least one organothiophosphorus compound, e.g., phosphorotrithioite and a carrier, liquid or solid, as defined hereinbefore.

It is also within the contemplation of this invention to provide such compositions containing from about 0.05 to about 2% and preferably from about 0.25 to about 1.5% by weight of the malodorous compound of a suitable anhydride as hereinbefore described.

The following examples demonstrate typical procedures for formulating deodorized organothiophosphorus compounds in accordance with the invention embodied herein.

EXAMPLE 1

A sample of S,S,S tributyl phosphorotrithioite (98–99% purity) containing approximately 0.6 weight per cent butyl mercaptan and having a strong mercaptan stench was sparged with nitrogen in a sparging bottle at 160°F for six hours using a base rate of 3.1 SCFH (Standard cubic feet per hour) per pound of the active ingredient. At the end of this period, the mercaptan content was reduced to less than 200 ppm and the S,S,S tributyl phosphorotrithioite had a low odor level.

EXAMPLE 2

A sample of the product prepared in accordance with Example 1 was stored neat in a sealed glass bottle. To a second sample of said product 0.5 wt. per cent acetic anhydride was added and the product then stored in a sealed glass bottle.

The bottles were opened periodically to check for odor recurrence. The untreated sample developed a significant mercaptan odor in two weeks storage. The sample treated with acetic anhydride developed no mercaptan odor during entire period of the storage stability test - nine months.

Any suitable gas which will affect the chemical properties of the organothiophosphorus material may be used for sparging, especially preferred in is inert gas such as nitrogen.

Although the amount of odor stabilizing material that may be used may vary over a somewhat broad range as long as the desired stabilization is achieved, satisfactory results are generally obtained by use of said material in an amount up to about 2% by weight of the malodorous organothiophosphorus compound, and more specifically, in an amount of from about 0.25 to 1.5% of acetic anhydride by weight of the malodorous compound, e.g., S,S,S tributyl phosphorotrithioite.

The compounds of the Examples were subjected to standard tests for such activity which each respective phosphorotrithioite compound is known to have. The results of the testing showed that the mixing of the phosphorotrithioite compound with the odor stabilizing compound as disclosed in the present invention did not adversely affect pesticidal activity or reduce plant growth regulant, i.e., cotton defoliant activity. In some instances, prolonged or increased activity was observed. Although the present invention has been described with preferred embodiments, it is to be understood that modifications and variations may be resorted to, without departing from the spirit and scope of this invention, as those skilled in the art will readily understand.

What is claimed is:

1. A method for stabilizing against malodor development a normally malodorous mercaptan-containing phosphorotrithioite compound having the following general formula:

$$P(SR)_3$$

wherein R is a $C_1$—$C_8$ alkyl which comprises adding to said compound from about 0.05 to about 1.5% by weight, based on the weight of said compound, of a $C_1$—$C_{20}$ alkyl anhydride to stabilize said compound against malodor development.

2. The method of claim 1 wherein said compound is gas sparged prior to admixture with said anhydride.

3. The method of claim 1 wherein said anhydride is acetic anhydride.

4. The method of claim 2 wherein said compound is admixed with acetic anhydride after said sparging.

5. The method of claim 2 wherein the compound is sparged by an inert gas.

6. The method of claim 5 wherein the inert gas is nitrogen.

7. The method of claim 1 wherein the compound is S,S,S tributyl phosphorotrithioite.

8. A substantially deodorized composition of a normally malodorous organthiophosphorous compound having the following general formula:

$$P(SR)_3$$

wherein R is $C_1$—$C_8$ alkyl and from about 0.05 – 2% by weight, based on the weight of said compound, of a $C_1$—$C_{20}$ alkyl anhydride.

9. The composition of claim 8 wherein the anhydride is acetic anhydride.

10. The composition of claim 8 wherein said compound is S,S,S tributyl phosphorotrithioite.

* * * * *

UNITED STATES PATENT AND TRADEMARK OFFICE
CERTIFICATE OF CORRECTION

PATENT NO. : 3,925,519
DATED : December 9, 1975
INVENTOR(S) : ROSS A. KREMER and RICHARD H. LEITMAN It is certified that error appears in the above–identified patent and that said Letters Patent are hereby corrected as shown below:

Col. 2, line 57          "tri(aminopropyl)" should be -- tri(aminoethyl) --.

Col. 4, line 31          " will affect" should be -- will not affect --.

Col. 4, line 33          "in is" should be -- is an --.

Col. 4, line 44          "compounds" should be -- compositions --.

Signed and Sealed this

Sixth Day of July 1976

[SEAL]

Attest:

RUTH C. MASON
*Attesting Officer*

C. MARSHALL DANN
*Commissioner of Patents and Trademarks*